(12) United States Patent
Komeya

(10) Patent No.: US 7,909,718 B2
(45) Date of Patent: Mar. 22, 2011

(54) SEAL CHAIN AND MANUFACTURING METHOD THEREOF

(75) Inventor: Akiyoshi Komeya, Kaga (JP)

(73) Assignee: Daido Kogyo Co., Ltd., Ishikawa Pref. (JP)

( * ) Notice: Subject to any disclaimer, the term of this patent is extended or adjusted under 35 U.S.C. 154(b) by 461 days.

(21) Appl. No.: 11/453,089

(22) Filed: Jun. 15, 2006

(65) Prior Publication Data

US 2006/0284483 A1  Dec. 21, 2006

(30) Foreign Application Priority Data

Jun. 17, 2005  (JP) .................... 2005-177559

(51) Int. Cl.
*F16G 13/06*  (2006.01)
(52) U.S. Cl. .............. 474/206; 59/78; 277/392
(58) Field of Classification Search ........... 474/202, 474/207, 206; 277/92, 83, 203.1, 206.1, 277/392, 549; 59/5, 8, 78
See application file for complete search history.

(56) References Cited

U.S. PATENT DOCUMENTS 5,943,855 A * 8/1999 Morimoto et al. ............ 59/5

FOREIGN PATENT DOCUMENTS

| JP | 49-648 | 1/1974 |
| JP | 64-30946 | 2/1989 |
| JP | 3-110265 | 11/1991 |

OTHER PUBLICATIONS

Pikley, Walter D; Peterson's Stress Concentration Factors: Chapter 3 Shoulder Fillets; 1997; John Wiley & Sons, Inc.; 2nd Edition, pp. 135-174.*
Japanese Office Action issued Dec. 21, 2010 in corresponding Japanese Patent Application No. 2005-177559 w/translation.

* cited by examiner

*Primary Examiner* — Robert A Siconolfi
*Assistant Examiner* — Anna Momper
(74) *Attorney, Agent, or Firm* — Wenderoth, Lind & Ponack, L.L.P.

(57) ABSTRACT

A seal chain in which a sealing member having a shape of a "plus" in section is steadily twisted (turned) and deformed into a shape of an "X" and whose abrasion resistance and flexing torque are improved. The sealing member is formed such that inner diametric side end faces of third and fourth lip portions extending in a transverse direction from a center base portion extend in a direction orthogonal to a radial direction and outer diametric side end faces thereof are formed as tapered faces such that width of the lip portion is widened from an edge face toward the base portion. A diagonal distance of the center base portion is within a range of 0.8 to 1.0 of a clearance between inner and outer link plates.

10 Claims, 8 Drawing Sheets

SEAL CHAIN AND MANUFACTURING METHOD THEREOF

BACKGROUND OF THE INVENTION

1. Field of the Invention

The present invention relates to a seal chain used as a driving chain for transportation machines such as a motor cycle and of general industrial machines or as a conveyer chain for a conveyor or the like and more specifically to a seal chain and a manufacturing method of the same using a sealing member whose cross-section is approximately in a shape of a "plus" sign in a natural condition.

2. Description of Related Art

Conventionally, the present applicant has proposed a method for manufacturing a seal chain using a ringed sealing member having a lip portion that extends in an inner diametric direction thereof in a natural condition and being attached between an inner link plate and an outer link plate such that it is twisted at the fulcrum of the lip portion as disclosed in Japanese Patent Publication No. 1994-48038 (JA-B-H06-43038). FIGS. 6A through 6C show its manufacturing method. As shown in FIG. 6A at first, a first lip portion $3a$ of the sealing member 3 is positioned between an edge of a bush head portion $7a$ and the outer link plate 8 and then the outer link plate 8 is assembled provisionally with a pin 2 while leaving a predetermined space c from the sealing member 3. The seal chain is then soaked in fluid grease, for example, in this state to feed the grease between the pin 2 and a bush 7 within the sealing member 3. Then, the outer link plate 8 is pressed in a direction of an arrow shown in FIG. 6B. As the outer link plate 8 is pressed at this time, the outer link plate 8 contacts with the sealing member 3. When the outer link plate 8 moves further in the direction of the arrow in a state in which the first lip portion $3a$ of the sealing member 3 abuts against the edge of the head portion $7a$ of the bush 7, the sealing member 3 is twisted as shown by arrows in FIG. 6C at the fulcrum of the abutting part.

Thereby, the sealing member 3 is positioned such that the first lip portion $3a$ abuts against an outer peripheral face of the edge of the bush head portion $7a$ and against the outer link plate 8, a third lip portion $3c$ abuts against the outer link plate 8, a fourth lip portion $3d$ abuts against the inner link plate 6 and a second lip portion $3b$ abuts against the inner link plate 6. That is, the sealing member 3 is sandwiched between the two link plates 6 and 8 in a shape of an "X" in section. The sealing member 3 is attached as described above on the sides of the bush 7 and the edge of the pin 2 is caulked to stop the outer link plate 8. The seal chain 1 is thus completed.

FIGS. 7A and 7B are section views showing different types of sealing member 3 in a natural state. The sealing member $3_1$ in FIG. 7A has a wide and semicircular first lip portion $3_1a$ extending in an inner diametric direction thereof, a second lip portion $3_1b$ having the same width with the first lip portion $3_1a$ and extending in an outer diametric direction thereof and third and fourth narrow lip portions $3_1c$ and $3_1d$ extending in both transverse directions from the first and second lip portions $3_1a$ and $3_1b$. The sealing member $3_1$ is formed approximately in a shape of a "plus" in section as a whole. An edge portion of the first lip portion $3_1a$ is formed into a shape of circular arc $r_1a$ having a semicircular curve and parts connecting the respective lip portions are formed by circular arcs of predetermined r.

The sealing member $3_2$ in FIG. 7B has a first lip portion $3_2a$ extending in an inner diametric direction and having an approximately circular shape in section and a second lip portion $3_2b$, a third lip portion $3_2c$ and a fourth lip portion $3_2d$ extending in an outer diametric direction and in both transverse directions and having the same width, respectively. Accordingly, the sealing member $3_2$ is formed such that the first lip portion $3_2a$ has a shape of circular arc $r_2a$, parts connecting the first lip portion $3_2a$ with the lip portions $3_2c$ and $3_2d$ are formed by concaved circular arcs r' and parts connecting the second lip portion $3_2b$ with the third and fourth lip portions $3_2c$ and $3_2d$ are formed by predetermined circular arcs r.

The third and fourth lip portions $3_1c$ and $3_1d$ as well as the third and fourth lip portions $3_2c$ and $3_2d$ of the conventional sealing members $3_1$ and $3_2$ have the same width $b_1$ and $b_2$, respectively, and extend in the transverse direction by a predetermined length from the position where they are connected with the first and second lip portions $3_1a$ and $3_1b$ or $3_2a$ and $3_2b$ with the relatively small circular arcs r and r'. They are formed almost symmetrically with respect to a center line a-a.

Because the sealing member $3_1$ or $3_2$ is interposed between the inner and outer link plates 6 and 8 in the seal chain 1, a clearance between the inner and outer link plates 6 and 8 must be large as compared to a non-seal chain having no seal. Accordingly, the seal chain described above requires a longer pin in order to meet with the large clearance and hence the pin is susceptible to being bent. Then, the tensile strength of the chain becomes small as compared to the non-seal chain even when a pin having the same diameter and a same link plate are used.

Although it is necessary to reduce the clearance between the inner and outer link plates 6 and 8 in order to increase the strength of the seal chain, the sealing member is exhausted quickly if a cross-sectional area of the sealing member is reduced. Then, pressure of the lip portions against the plate is weakened and lubricant oil leaks, ending up dropping abrasion resistance of the chain and shortening the life of the chain.

In the seal chain 1 described above, each lip portion contacts with the inner link plate, the outer link plate or the bush head portion in the state in which the sealing member is sandwiched between the inner and link plates 6 and 8 such that the sealing member surrounds the bush head portion $7a$. Then, recesses between the lip portions become oil reservoirs, thus retaining the durability and flexibility of the chain. In the case of the sealing member $3_1$ in FIG. 7A, length $z_1$ of a diagonal line of a central base portion $3_1e$ is long, so that the lip portions having the recesses, i.e., the oil reservoirs described above, cannot be effectively formed when improving the strength of the chain by reducing the clearance between the outer and inner link plates. Then, it becomes unable to display the particular effects of a seal ring having the shape of X in section of reducing transmission loss of the chain while maintaining the durability of the chain and improving its flexibility.

In case of the sealing member $3_2$ in FIG. 7B, a cross-sectional area of a central base portion $3_2e$ becomes small if the shape of the sealing member is analogously reduced corresponding to the reduction of the clearance and the problem of dropping the abrasion resistance of the chain described above becomes remarkable.

The sealing member $3_2$ (although the sealing member $3_2$ will be explained below, the same applies also to the sealing member $3_1$) is twisted as shown by a dotted chain line in FIG. 8 when the first lip portion $3_2a$ abuts against the edge f of the bush head portion $7a$. At this time, the third lip portion $3_2c$ is pressed by the movement of the outer link plate 8, the fourth lip portion $3_2d$ moves along an outer circumferential face of the bush head portion $7a$ and the first lip portion $3_2a$ is twisted while turning at the fulcrum of a contact point of the edge f of the bush head portion 7a and the first lip portion 3₂a. Accordingly, a suitable gap g is necessary between the edge of the fourth lip portion 3₂d and the inner link plate 6 in order for the sealing member 3₂ to turn. Meanwhile, as for length h of head of the bush head portion 7a, even when the clearance i between the inner and outer link plates is to be reduced when the chain is assembled, a gap d (=i−h) between the edge f of the bush head portion and the outer link plate 8 cannot be reduced in order to avoid the metals contacting each other, so that the length h of the head must be reduced if the clearance is to be reduced. Accordingly, as the clearance is reduced in order to improve the strength of the chain, the length h of the bush head portion 7a cannot but be shortened and the gap g suitable for turning the sealing member 3₂ as described above cannot but be also reduced. Then, one end j₁ of the third lip portion 3₂c must be moved to j₂ and energy for drawing the third lip portion 3₂c is required at this time in order to move the outer link plate from 8₁ to position of 8₂ and to turn and attach the sealing member 3₂ at normal position as the X-shaped sealing member (ring) as indicted by a chain line.

In a case of the shape of the sealing member 3₂ (the same applies also to the sealing member 3₁) having the third lip portion 3₂c having the same width b₂ as described above, the pressure from the outer link plate 8₁ acts as a parallel distributed load on the third lip portion 3₂c and its resultant force acts on the center part of the sealing member 3₂ as indicated by an arrow F. However, a turning moment of the sealing member 3₂ based on this resultant force is relatively small and when the gap g is small, there is a case when an edge face k₁ of the fourth lip portion 3₂d contacts the inner link plate 6, as indicated by k₂, before the sealing member 3₂ turns going against the energy of drawing the third lip portion 3₂c. Then, as indicated by the sealing member 3₂', the edge faces k₂ and s₂ of the third and fourth lip portions 3₂c and 3₂d are pressed against the inner and outer link plates 6 and 8 before the sealing member is fully turned. At this time, although the first lip portion 3₂a of the sealing member abuts against the head face f of the bush head portion 7a and the sealing member 3₂ generates moment at the fulcrum of the abutment point, the first lip portion 3₂a tends to be deformed and a force twisting the sealing member 3₂ is substantially generated based on turning moment F·1 at a fulcrum e generated in the central base portion 3₂e. Then, as for the third and fourth lip portions 3₂c and 3₂d having the same width b₂ from their edge face to the central base portion 3₂e, the turning moment (F·1) to the fulcrum e acting on the central base portion 3₂e of the sealing member 3₂' is very small, the sealing member 3₂' is squeezed in the shape of a "plus" between the both inner and outer link plates 6 and 8, reaction force acting from the third and fourth lip portions 3₂c and 3₂d to the inner and outer link plates 6 and 8 is balanced on the inner and outer diametric sides in this state and the sealing member is stabilized in the shape of a "plus". If such sealing members 3₂' exist even in a small number, it becomes impossible to obtain a seal chain having a sealing member that has the particular shape of an "X" by which the functions of retaining the abrasion resistance of the chain owing to the sealing function described above and of retaining the flexibility of the chain owing to the lip portions are well balanced.

SUMMARY OF THE INVENTION

Accordingly, it is an object of the invention to provide a seal chain, and a manufacturing method of the same, that improves the abrasion resistance and the flexing torque of the chain and hence solves the above-mentioned problems even if the tensile strength of the chain is enhanced by reducing the clearance between the inner and outer link plates by changing the shape of the sealing member.

The invention solves the above-mentioned problems by a seal chain in which a portion of a bush (17) projects out of an inner link plate (16) as a bush head portion (17a) and a ringed sealing member (13) is disposed so as to surround the head portion (17a) and so that it is sandwiched between the inner and link plates, the sealing member (13₁, 13₂) has a cross-section in a shape of a "plus" in a natural condition and has a center base portion (13e), a first lip portion (13a) that extends in an inner diametric direction from the center base portion, a second lip portion (13b) that extends in an outer diametric direction from the center base portion and third and fourth lip portions (13c, 13d) that extend in transverse directions from the center base portion and when the outer link plate (18) is moved in a direction approaching the inner link plate (16) while the first lip portion (13a) is disposed between an edge (f) of the bush head portion (17a) and the outer link plate (18), the sealing member is twisted by a turning moment generated due to contact with the bush head portion, is deformed approximately into a shape of an "X" in section and is sandwiched between the inner and outer link plates (16 and 18).

Specifically, the seal chain is characterized in that the first lip portion (13a) has a circular shape or a shape close to that in section formed by a face of a circular arc (r₁) or a curved face close to that, the third and fourth lip portions (13c, 13d) are formed to be mirror-symmetrical with respect to each other and are formed so that their inner diametric side end faces (q) extend in a direction almost orthogonal to a radial direction (O-O) of the sealing member and so that their outer diametric side end faces (u) are formed such that width of the lip portions becomes wider on the center base portion (13e) side than on an edge portion (s) side (b<bn) and a diagonal distance (z) of the center base portion (13e) of the sealing member is within a range of 0.8 to 1.0 of a clearance (i) between the inner and outer link plates in a natural condition.

It is noted that the cross-section of the first lip portion (13a) described above is not limited to be circular. It may be a shape close to a circle such as an oval or ellipse. The outer diametric side end faces of the third and fourth lip portions (13c and 13d) may also include a straight line such as a tapered face or a curve such as a circular arc having a large radius and one whose width is sharply widened in a direction from the edge face to the center base portion.

A manufacturing method of a seal chain comprises a step of projecting a portion of a bush (17) out of an inner link plate (16) as a bush head portion (17a) and a step of disposing a ringed sealing member (13) so as to surround the bush head portion (17a) and so that it is sandwiched between the inner and outer link plates, and the sealing member (13₁, 13₂) has a cross-section in a shape of a "plus" in a natural condition and has a center base portion (13e), a first lip portion (13a) that extends in an inner diametric direction from the center base portion, a second lip portion (13b) that extends in an outer diametric direction from the center base portion and third and fourth lip portions (13c and 13d) that extend in transverse directions from the center base portion, wherein the first lip portion (13a) has a shape of circle or a shape close to that in section formed by a face of circular arc (r₁) or a curved face close to that, the third and fourth lip portions (13c and 13d) are formed to be mirror-symmetrical with respect to each other and are formed so that their inner diametric side end faces (q) extend in a direction almost orthogonal to a radial direction (O-O) of the sealing member and so that their outer diametric side end faces (u) are formed such that width of the lip portions is wider on the side of the center base portion (13e) than on the side of an edge portion (s), and a diagonal distance (z) of the center base portion (13e) of the sealing member is within a range of 0.8 to 1.0 of a clearance between the inner and outer link plates in a natural condition, and when the outer link plate (18) is moved in a direction toward the inner link plate (16) while disposing the first lip portion (13a) between an edge (f) of the bush head portion (17a) and the outer link plate (18), the sealing member (13) is twisted by turning moment generated based on contact with the bush head portion, is deformed such that its cross-section is deformed almost into a shape of an "X" and is sandwiched between the inner and outer link plates (16 and 18).

Preferably, the outer diametric side end faces (u) of the third and fourth lip portions (13c and 13d) are formed so that the width of the lip portion is gradually widened from the edge portion (s) to the center base portion (13e).

Or more preferably, the outer diametric side end faces (u) of the third and fourth lip portions (13c and 13d) are tapered faces having predetermined gradient (a) and widened toward the center base portion from the edge portion.

Still more, width (n) of a narrowest portion of the first lip portion (13a) on the side of the center base portion (13e) is desirable to be within a range of 0.5 to 0.6 of the clearance (i).

A sum ($2r_1$+b) of the width ($2r_1$) of the first lip portion (13a) and the width (b) of edge portions (s) of the third and fourth lip portions (13c, 13d) is desirable to be within a range of 0.8 to 1.6 of the clearance (i).

The clearance (i) is desirable to be within a range of 4 to 7% of a chain pitch (p).

It is noted that the reference numerals within the parentheses above are given for the purpose of referencing the drawings and by no means affect the scope of Claims.

According to the invention described above, the sealing member having the shape of a "plus" in section in the natural condition is deformed into the shape of an "X" and is sandwiched between the inner and outer link plates and the first, second, third and fourth lip portions contact the outer link plate or the bush head portion, it can reduce the flexing torque while maintaining the lubricant sealing function. Still more, because the outer diametric side end faces of the third and fourth lip portions are formed so that the width of the lip portions is wider on the side of the center base portion than the edge portion thereof and the strength thereof on the outer diametric side is increased as compared to that on the inner diametric side, the sealing member readily turns based on the pressure of the outer link plate and may be steadily attached in the state in which the sealing member is twisted, thus improving the reliability of the seal chain, even if the clearance between the both inner and outer link plates is narrow and the height of the bush head portion is reduced in attaching the sealing member while twisting (turning) it.

Still more, because the width of the third and fourth lip portions at the center base portion side is widened and the cross-sectional area of the sealing member or especially that of the center base portion is increased, the sealing member will not be exhausted quickly and can hold its repulsion force for a long period of time. Then, even if it is applied to a seal chain in which the clearance of the link plates is reduced to improve the tensile strength of the chain, the sealing member can keep the sealing function for a long period of time and can maintain the abrasion resistance of the seal chain by preventing the metals, i.e., the bush head portion and the outer link plate, from contacting each other.

It is noted that when the diagonal distance of the center base portion of the sealing member is smaller than 80% of the clearance, the cross-sectional area of the sealing member or specifically of the center base portion becomes insufficient to keep the effects described above. Still more, when the diagonal distance described above is greater than the clearance, the sealing member is excessively compressed and the flexing torque becomes large. Then, it becomes unable to fully form the recesses between the lip portions, to hold enough lubricant in the recesses, to improve the flexing torque and to perform the sealing function for a long period of time.

While the sealing member slides in a body with the inner link plate in general between the inner and outer link plates, the inner diametric side end faces of the third and fourth lip portions extend in a direction orthogonal to the radial direction, so that a large recess may be formed between the first and third (or fourth) lip portions. Then, the enough lubricant may be held in the recess on the sliding side, so that the performance related to the flexing torque and the sealing function may be kept good. Still more, because the outer diametric side end faces of the third and fourth lip portions are formed aslant so that the width of the lip portions at the center base portion side becomes wide, the recess formed between the outer link plate, the fourth (or third) lip portion and the second lip portion becomes relatively small. However, it exerts less influence on the flexing torque and the sealing function because the recess exists on the side of the inner link plate that rotates in a body with the sealing member. Rather, it functions advantageously in for improving the life of the sealing member by increasing the cross-sectional area of the sealing member, or of the center base portion in particular, and preventing the sealing member from exhausting.

The sealing member can obtain a large rotation torque about the contact with the bush head portion due to the pressure of the outer link plate, so that the whole sealing member may be steadily twisted (by rotation) and be attached between the link plates and so that a highly reliable seal chain in which the flexing torque and the abrasion resistance are well balanced may be steadily and accurately manufactured.

Still more, because the third and fourth lip portions are formed so that their outer diametric side end faces are gradually widened from the edge portion to the center base portion, so that the third and fourth lip portions can smoothly convert the pressure from the outer link plate into a force in the direction of rotation torque.

Still more, because the outer diametric side end faces of the third and fourth lip portions are formed as tapered faces having a predetermined gradient expanding from the edge portion toward the center base portion, the third and fourth lip portions change the pressure acting on their edge portion in the outer diametric direction so that bias in the turning torque direction acts on the sealing member.

Because the width of the narrowest portion of the first lip portion is within the range of 0.5 to 0.6 of the clearance, the recesses, i.e., the oil reservoirs, especially of the recess formed between the outer link plate and the first and third (or fourth) lip portions may be fully formed, the sealing function of the sealing member may be maintained for a long period of time and the flexing torque may be improved. It is noted that if the width is 0.5 or less of the clearance, the compression of the sealing member becomes insufficient and the lubricant splashes quickly. When the width is 0.6 or more of the clearance, the recesses may not be fully formed.

Because the sum of the width of the first lip portion and the width of the third and fourth lip portions is within the range of 0.8 to 1.6 of the clearance and the first lip portion is deformed by a predetermined value of compression and closely contacts the outer link plate and the bush head portion and the fourth (or third) lip portion is deformed by the predetermined value of compression and closely contacts with the inner link plate, the sealing member can achieve the sealing function and the improvement of the flexing torque in a well balanced manner. It is noted that if the sum is 0.8 or less of the clearance, the sealing member cannot perform the sealing function well and the abrasion resistance of the seal chain cannot be assured. Still more, when the sum is 1.6 or more of the clearance, the flexure resistance of the chain increases and sufficient flexing performance cannot be obtained.

Because the clearance is within the range of 4 to 7% of the chain pitch, the chain tensile strength may be improved by shortening the length of the pin even though it is a seal chain. It is noted that if the clearance is 4% or less of the chain pitch, the sealing member is excessively compressed, the flexing torque increases, the sealing member is exhausted after a predetermined driving time and the elongation of the chain advances rapidly. Still more, if the clearance is 7% or more of the chain pitch, the pin is prolonged and sufficient chain tensile strength cannot be assured.

It is noted that the summary of the invention described above does not necessarily describe all features of the invention. The invention may also be a sub-combination of the features described above.

BRIEF DESCRIPTION OF THE DRAWINGS

FIGS. 2A and 2B are enlarged views showing sections of inventive sealing members in a natural condition, wherein FIGS. 2A and 2B show different embodiments.

FIGS. 4A and 4B are graphs showing an adequate clearance of the both inner and outer link plates to which the inventive sealing member is suitably applied, wherein FIG. 4A shows anti-abrasive resistances differentiated by different clearances and FIG. 4B shows a relationship between the clearance and flexing torque.

FIGS. 5A and 5B are graphs showing adequate values of width ($2r_1$) of a first lip portion and width (b) of the edge of a fourth lip portion of the sealing member, wherein FIG. 5A shows a relationship between their sum and anti-abrasion time and FIG. 5B shows the relationship between their sum and the flexing torque.

DETAILED DESCRIPTION OF THE INVENTION

Figure 1:
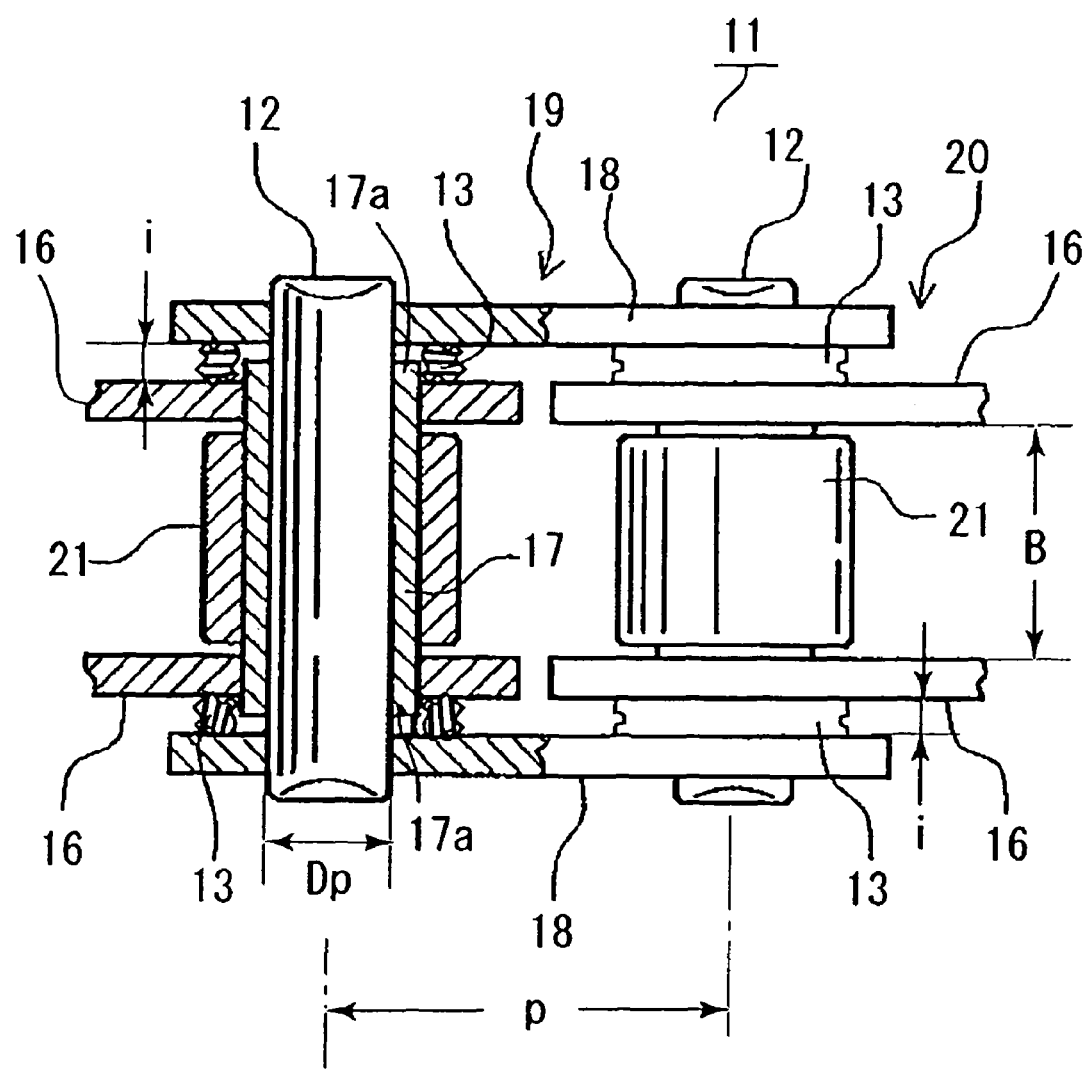
FIG. 1 is a plan view, partially in section, showing a seal chain to which the invention is applied.

The invention will now be described based on preferred embodiments shown in the drawings, which are not intended to limit the scope of the invention, but to exemplify the invention. All of the features and the combinations described in the embodiments are not necessarily essential to the invention.

The embodiments of the invention will be explained below with reference to the drawings. As shown in FIG. 1, a seal chain 11 of the invention is constructed by outer (pin) links 19 in which both ends of two steel cocoon-like outer (pin) link plates 18 are linked by a pin 12 and inner (roller) links 20 in which both ends of two inner (roller) link plates 16 having the same shape with the link plate 18 are linked by a bush 17. The pin 12 is inserted into the bush 17, so that the outer and inner links 18 and 20 are linked endlessly. A roller 21 rotatably fits around the bush 17 and the bush 17 is fixed so as to project out of an outer side face of the inner link plate 16 by a predetermined length. Then, a sealing member (seal ring) 13 of the invention is interposed between the inner and outer link plates 16 and 18 so as to surround the projecting head portion 17a of the bush 17.

A clearance i between the outer and inner link plates 18 and 16 (2i in the whole chain because there exist clearances on both sides of the link plates) is arranged to be smaller than that of the conventional seal chain and the clearance with respect to a pitch p of the chain is set in a range of 0.04 to 0.07p or more preferably 0.05 to 0.06p (it is about i=0.08 to 0.09p in a conventional seal chain).

The sealing member 13 is made of a rubber ring having a shape of a "plus" in section in a natural state and is deformed into a shape of an "X" when it is attached. Lubricant such as grease or oil is disposed in a bearing space between the pin 12 and the bush 17. When the sealing member 13 is compressed by a predetermined degree between the outer and inner link plates 18 and 16 when it is attached, rubber whose hardness is relatively hard of Hs 80 degrees or more (more than 80° and less than 100°) is used as the material of the sealing member 13. It is noted that measurement of the hardness of the rubber has been carried out based on the Shore A test.

Figures 2A, 2B:
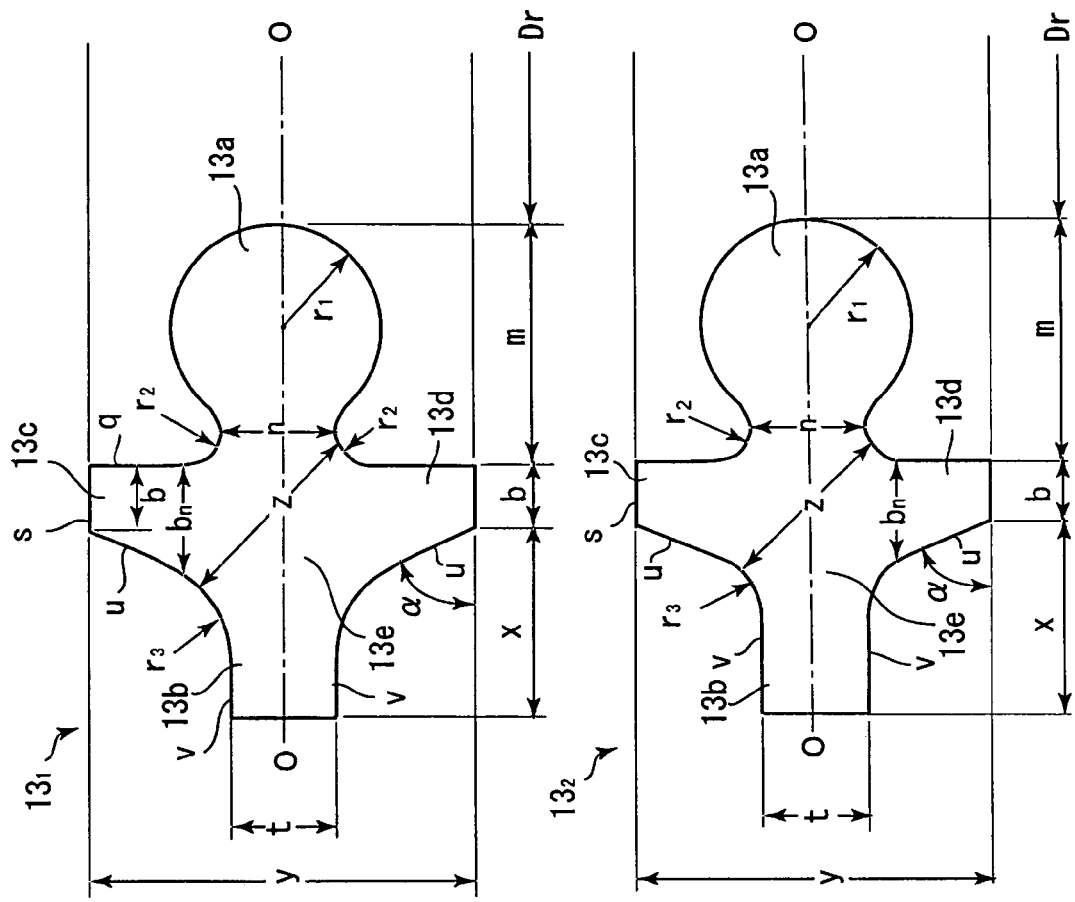

FIGS. 2A and 2B show the section of the sealing members 13 ($13_1$, $13_2$) in the natural state. Although the sealing member $13_1$ and $13_2$ in FIG. 2 look like each other, they are different in the height and the angle of gradient of the third and fourth lip portions. The sealing member 13 in the natural state is formed of the ring having the shape of a "plus" such that lip portions extend from a center basal portion 13e to inner and outer diametric directions and in transverse directions. That is, the sealing member 13 has a first lip portion 13a formed in the inner diametric direction approximately in a shape of a circle, a second lip portion 13b formed in the outer diametric direction approximately in a shape of a square, third and fourth lip portions 13c and 13d formed in the transverse directions crossing at right angles with the first and second lip portions mirror-symmetrically with respect to a center line O-O in the width direction. The first lip portion 13a has a face of circular arc $r_1$ of about 270 degrees and its basal end side is smoothly connected with the third and fourth lip portions 13c and 13d with connecting curves $r_2$ and $r_2$. The radius $r_1$ of the face of circular arc described above, width n of the connection part of the first lip portion 13a and width t of the second lip portion are almost equal to each other ($r_1 \approx n \approx t$, it is noted that a range within around ±20% will be defined to be almost equal here).

The third and fourth lip portions 13c and 13d extend in the transverse directions such that their end faces q on the inner diametric side, i.e., on the side of the first lip portion 13a, crosses at right angles with the center line O-O in the radial direction of the ring. Edge portions s of those lip portions 13c and 13d extend in parallel with the center line O-O and have width b (length in the radial direction) smaller than or almost equal with the width t of the second lip portion 13b. Then, outer diametric side end faces u (on the side of the second lip portion 13b) of these lip portions 13c and 13d extend in such a manner that width of the lip portions expands with a predetermined gradient a from the edge portions s toward the center base portion 13e and are connected with the second lip portion 13b with curves $r_3$. Accordingly, the inner and outer diametric sides of the third and fourth lip portion 13c and 13d are asymmetrical and the outer diametric faces u ($r_3$) thereof are formed so as to gradually spread from the edge toward the center base portion 13e.

The gradient a described above is preferably be 60° to 70°. If it is 70° or more, twisting torque (moment) is not fully generated and the cross-sectional area is not fully enlarged when the sealing member is attached. If it is 60° or less, oil reservoirs to be formed by the lip portions and recesses between the lip portions are not fully formed. The curve $r_3$ connecting the third and fourth lip portions 13c and 13d with the second lip portion 13b has a radius larger than that of the curve $r_2$ connecting the first lip portion 13a with the third and fourth lip portions 13c and 13d and the end face u on the outer diametric side having the gradient a is connected smoothly with a parallel face v (face parallel with the center line O-O) of the second lip portion 13b. Further, the width y of the sealing member 13 is preset to be larger than the clearance i of the seal chain by 60 to 100% or more preferably by 70 to 90% (1.6i<y<2.0i or more preferably 1.7i<y<1.9i). It is noted that the diameter (width) $2r_1$ of the first lip portion 13a is smaller than the width y of the sealing member 13 ($2r_1$<y, or more preferably $2r_1$<0.5y).

Then, the sealing member 13 is preset so that a diagonal distance z (least length connecting the curved faces $r_2$ and $r_3$) of the center base portion 13e falls within a range of 0.8 to 1.0 or more preferably within a range of 0.91 to 1.0 of the clearance i of the seal chain 11 (0.8i<z<1.0i, or more preferably 0.91i<z<1.0i). Still more, the width n of a least portion (narrow portion) of the first lip portion 13a is preset to be 60% or less of the clearance i (n 0.6i). Further, the sealing member 13 is set so that a sum of the width b of the edge of the third and fourth lip portions 13c and 13d and the diameter (width) $2r_1$ of the first lip portion 13a falls within a range of 80 to 160% of the clearance described above, i.e., [0.81≦b+$2r_1$≦1.6i, or more preferably, i≦b+$2r_1$<1.6i].

Next, a concrete example of the sealing member 13 applied to a roller chain having a pin diameter $D_P$=5.23 mm, a clearance i=0.7 mm and inner width of inner link B=9.53 mm will be explained.

Embodiment 1

FIG. 2A is a section view of the sealing member $13_1$. Respective dimensions of the sealing member $13_1$ fall within a range of 5.9 to 6.3 mm and they may be presented based on a ring inner diameter (diameter) Dr of the sealing member $13_1$ in the natural state, as follows. That is, the radius $r_1$ of the first lip portion 13a=0.059 Dr, the length of the first lip portion 13a in the radial direction m=0.138 Dr, the length (width) of the third and fourth lip portions 13c and 13d in the radial direction b=0.036 Dr and the length of the second lip portion 13b in the radial direction x=0.095 Dr. Accordingly, the whole length of the sealing member $13_1$ in the radial direction (m+b+x) =0.269 Dr. Still more, the width of the sealing member $13_1$ y=0.216 Dr, the width of the second lip portion t=0.057 Dr, the curves connecting the first lip portion with the third and fourth lip portions $r_2$=0.02 Dr, the curves connecting the second lip portion with the third and fourth lip portions $r_3$=0.059 Dr, the minimum width of the first lip portion n=0.066 Dr and the gradient of the curve u on the outer diametric side of the third and fourth lip portions α=63° to 65°. Still more, the diagonal distance of the center part z≈0.68 mm.

Accordingly, 0.8i(0.56)<z(about 0.68)<i(0.7) and n(about 0.4)≦i(0.7)×0.6=0.42. Still more, 0.8×i(0.7)=0.56<b+$2r_1$=about 0.94<1.6×i(0.7)=1.12. It is noted that hardness of the sealing member is Hs 80° or more.

Embodiment 2

FIG. 2B shows a section of the sealing member $13_2$. When the sealing member $13_2$ is shown based on an inner diameter of its ring Dr which is 5.9 to 6.3 mm in a natural condition, a radius $r_1$ of the first lip portion 13a=0.059 Dr, the length in the radial direction of the first lip portion 13a=0.0138 Dr, a length (width) b in the radial direction of the third and fourth lip portions 13c and 13d=0.036 Dr and the length x in the radial direction of the second lip portion 13b=0.095 Dr Accordingly, an overall length (m+b+x) in the radial direction of the sealing member $13_1$=0.269 Dr. The width y of the sealing member $13_1$=0.2 Dr, the width $t_3$ of the second lip portion=0.057 Dr, the curve $r_2$ connecting the first, third and fourth lip portions=0.197 Dr, the curve $r_3$ connecting the second, third and fourth lip portions=0.02 Dr, the minimum width n of the first lip portion=0.66 Dr and the gradient a of the outer diametric side face u of the third and fourth lip portions=67 to 69° The diagonal distance of the center part z≈0.62 mm.

Accordingly, 0.8i(0.56)>z(about 0.62)<i(0.7) and n(about 0.4)≦i(0.7)×0.6=0.42. Still more, 0.8×i(0.7)=0.56<b+$2r_1$=about 0.94<1.6×i(0.7)=1.12. It is noted that the hardness of the sealing member is Hs 80° or more.

Figure 3:
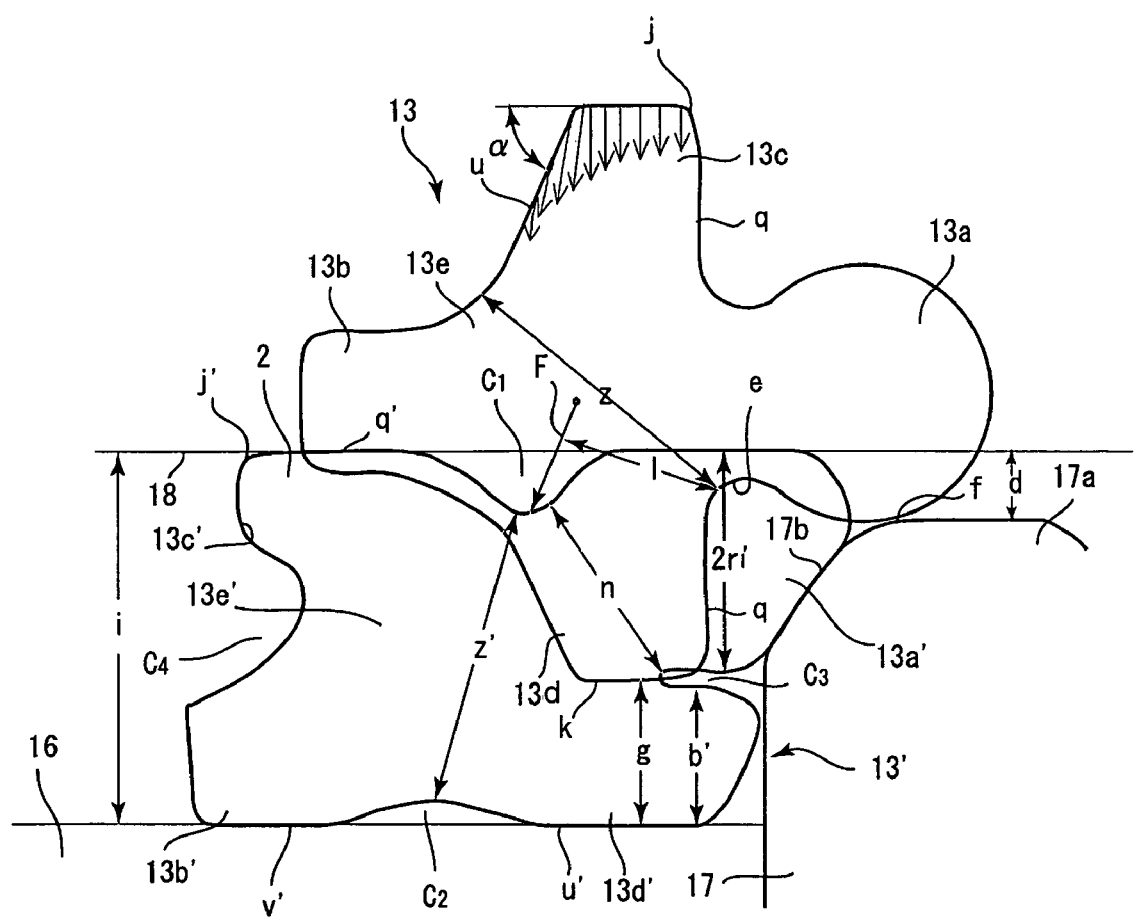
FIG. 3 is an enlarged section view showing a state in which the sealing member is attached to a chain in twist.

Next, a state during attaching of the sealing member 13 described above to the chain and a state after attaching of the sealing member 13' to the chain will be explained with reference to FIG. 3. The sealing member 13 has the shape of a "plus" in section in a natural condition and an outer peripheral face 17b of an edge of the bush head portion 7a of the bush 17 is tapered or curved.

Figure 8:
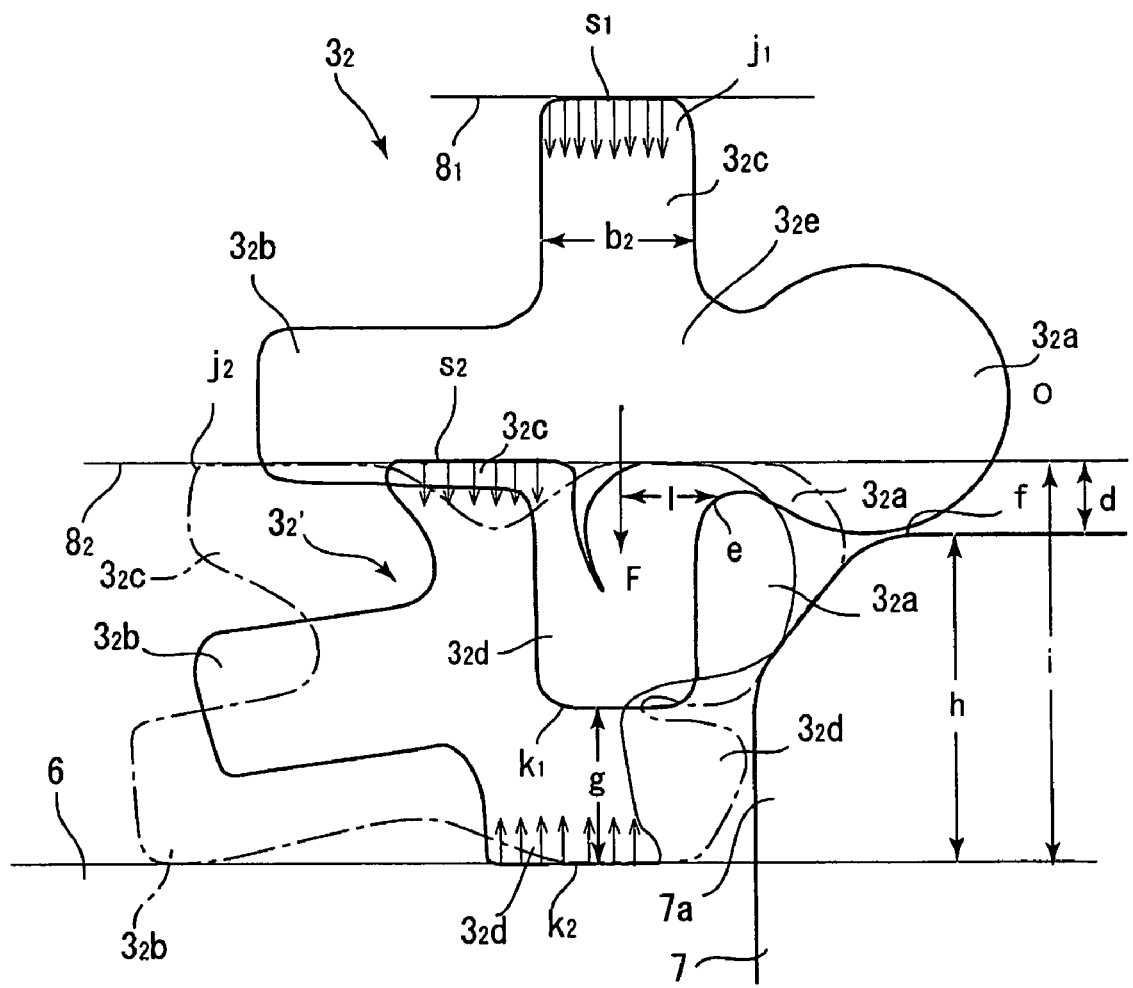
FIG. 8 is an enlarged section view showing a state in which the prior art sealing member is twisted.

At first, the sealing member 13 in the natural condition is in a state in which the first lip portion 13a thereof abuts against the edge f of the bush head portion 17a. Then, due to pressure from the outer link plate 18, an inner diametric side end face q of the fourth lip portion 13d moves toward the inner link plate 16 along the outer peripheral face of the bush head portion 17a while deforming the first lip portion 13a. At this time, because the third lip portion 13c has the vertical face q on the inner diametric side and the sloped face u of predetermined gradient on the outer diametric side and strength of the inner diametric side of the sealing member made of the rubber differs from that of the outer diametric side, the inner diametric side thereof readily deforms and does not transfer the pressure from the outer link plate, the outer diametric side thereof deforms less and transmits the pressure described above. Thereby, stress (pressure transferring force) acting on the third lip portion 13c generated based on the outer link plate varies as shown in the figure and the resultant force F acts aslant in the outer diametric direction toward a position leaned toward the outer diametric side. Accordingly, when the first lip portion 13a abuts against the edge f of the bush head portion, the sealing member 13 turns because the first lip portion 13a relatively readily deforms. Then, a moment that tries to turn the sealing member, or specifically the moment that acts on the center base portion 13e, turns out to be a moment F·l at a fulcrum of turn e of the inner diametric side curved face $r_2$ of the fourth lip portion 13d. This moment is greater than that of the conventional sealing member (see FIG. 8) and surpasses the energy of stretching the edge j of the third lip portion 13c on the inner diametric side to j', so that the sealing member 13 is steadily turned and twisted into the shape of an "X" as denoted as 13'. It is noted that even if the distance from an end face k of the fourth lip portion 13d to the inner link plate 16 is short and the end face k of the fourth lip portion 13d contacts the inner link plate 16 because the distance for turning the sealing member 13 is short and the sealing member does not completely turn at this time, the sealing member 13 steadily turns because the reaction force received by the fourth lip portion 13d differs on the inner and outer diametric sides.

When the chain is assembled, the sealing member 13' in the shape of an "X" is put into the state in which the edge j' of the third lip portion 13c' on the inner diametric side is stretched (j→j'), the inner diametric side end face q' thereof closely contacts the outer link plate 18 and the first lip portion 13a' is deformed such that it closely contacts between the tapered or curved face 17b of the bush head portion 17a and the outer link plate 18. While the first lip portion 13a is compressed and deformed such that it seals the part between the edge f of the bush 17 and the outer link plate 18 and contains lubricant injected in a bearing space between the pin and the bush, it will not bite into the part between the edge of the bush and the outer link plate 18 in a shape of a wedge because the diameter (width) $2r_1$ of the first lip portion 13a is relatively large and has a face in a circular arc.

The fourth lip portion 13d' of the sealing member 13' deforms such that it comes closer to the first lip portion 13a' and the outer diametric side end face u' closely contacts the inner link plate 16. The second lip portion 13b' deforms such that its distance from the fourth lip portion 13d' expands and its one side face v' closely contacts the inner link plate 16. At this time, the reaction force caused when the third lip portion 13c' is stretched and expanded acts on the fourth lip portion 13d' and closely contacts the outer diametric side end face u' to the inner link plate 16. Still more, a large restoring force caused by the shape of the outer diametric side end faces u and $r_3$ of the third lip portion 13c that is gradually widened acts on the second lip portion 13b' and closely contacts its one side face v' to the inner link plate.

Then, because length z' of the diagonal line at the center base portion 13e' of the sealing member is almost equal with the length z of the diagonal line in the natural condition even if it slightly decreases because the sealing member is stretched and the diagonal length z' is preset in a range of 0.8 to 1.0 of the clearance i between the both link plates 16 and 18 ($0.8 \leq z' \leq i$), a ringed recess $C_1$, i.e., a predetermined oil reservoir space, is formed between the first lip portion 13a', the third lip portion 13c' and the outer link plate 18 and a ringed recess $C_2$, i.e., a predetermined oil reservoir space, is formed between the fourth lip portion 13d', the second lip portion 13b' and the inner link plate 16. The recess $C_1$ described above is a relatively large space because it is caused by the inner diametric side end face q that is the vertical face of the third lip portion 13c and the recess $C_2$ described above is a relatively small space because it is caused by the outer diametric side end face u that is the tapered face of the third lip portion 13c.

A ringed recess $C_4$ that opens in the outer diametric direction is also formed between the second lip portion 13b' and the third lip portion 13c'. Furthermore, because the width n' on the base portion side of the first lip portion 13a' is approximately 60% or less of the clearance i (n 0.61i), the recesses $C_1$ and $C_2$ described above have enough size to function as an oil reservoir.

It is noted that the first lip portion 13a' is compressed and deformed between the outer link plate 18 and the bush head portion 17a and its diameter $2r_1$' is significantly reduced as compared to the diameter $2r_1$ in the natural condition. The fourth lip portion 13d' is also compressed by the inner link plate 16 and is stretched in the outer diametric direction, so that the width b' of its edge is also significantly reduced as compared to the width b in the natural condition. Accordingly, when the diameter $2r_1$ and the edge width b of the lip portion in the natural condition is greater than 80% and smaller than 160% of the clearance i ($0.8i \leq b+2r_1 \leq 1.6i$), the deformed sealing member 13' attached in the chain has a relationship of $i \leq b'+2r_1'$ in general and a small ringed recess $C_3$ is formed between the first lip portion 13a' and the fourth lip portion 13d'.

In the X-shaped sealing member 13', the respective lip portions 13a', 13b', 13c' and 13d' form independent lip portions, respectively, by the respective recesses $C_1$, $C_2$, $C_3$ and $C_4$ and reduce abrasion resistance with the inner and outer link plates 16 and 18 and keep favorable chain flexing performance. The respective lip portions 13a', 13b', 13c' and 13d' also keep the adhesion with the outer and inner link plates 18 and 16 and the bush head portion 17a and hold the lubricant by the excellent sealing performance by the restoring force caused by the deformation of the sealing member described above.

Figure 7A:
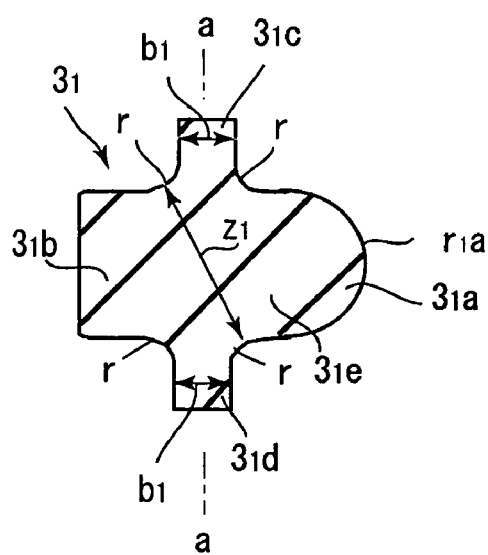
FIGS. 7A and 7B are section views showing different embodiments of a prior art sealing member.
Figure 7B:
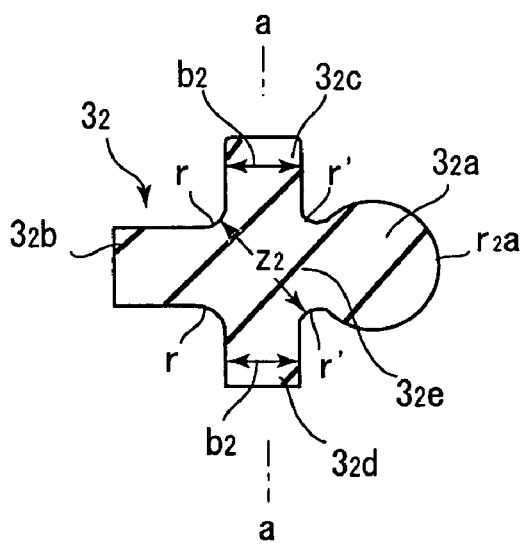

Still more, the thickness of the third and fourth lip portions 13c and 13d gradually increase toward the center base portion 13e due to the outer diametric side tapered face u and the large curved face $r_3$ and its cross-sectional area, especially of the center base portion 13e, is large as compared to that of the conventional sealing member 3 (see FIG. 7) having the lip portions whose thickness b are equal. The cross-sectional area of the twisted and deformed sealing member 13' is not so different from that in the natural condition. Thus, owing to its large cross-sectional area, the sealing member 13' attached to the chain exerts a repulsive force on both link plates for a long period of time (improves resilience) and has favorable abrasion resistance. That is, because the diagonal distance z that is an index of the center base portion 13e of the sealing member 13 is within the range of 0.8i to 1.0i with respect to the clearance i, the recesses $C_1$ and $C_2$, i.e., the oil reservoirs, or the recess $C_2$ on the outer link plate 18 side, i.e., on the sliding side in particular, may have an enough cross-sectional area, allowing the improvement of both flexibility of the chain and the abrasion resistance by the cross-sectional area.

It is noted that the upper half portion of the seal chain 11 has been explained above, and the third lip portion 13c contacts the inner link plate 16 and the fourth lip portion 13d contacts the outer link plate 18. However, in the lower half portion of the chain, the third lip portion 13c contacts the outer link plate 18 and the fourth lip portion 13d contacts the inner link plate 16, respectively, as a matter of course. The sealing member 13 operates in the same manner also in this case because it is symmetrical about the center line O-O.

The seal chain 11 to which the sealing member 13 is attached, as described above, is passed around sprockets and transmits power or conveys articles as a conveyor chain. At this time, the inner link 20 and the outer link 19 flex by relatively rotating the pin 12 and the bush 17 (bearing section) in engagement and disengagement with/from the sprockets. The relative rotation of the pin 12 with the bush is carried out smoothly through the intermediary of lubricant contained by the sealing member 13. The lubricant is held in the bearing space between the pin 12 and the bush 17 because the first lip portion 13a' of the sealing member 13 (denoted as 13' because the sealing member in the twisted state shown in FIG. 3 will be described hereinafter) adheres between the bush head portion 17a and the outer link plate 18.

In connection with a friction area, the sealing member 13' moves together with the inner link 20 and moves relative to the outer link plate 18. The relative movement (sliding) of the first lip portion 13a' and the third lip portion 13c' of the sealing member 13' with the outer link plate 18 will not cause large abrasion resistance because the lubricant in the bearing space described above leaks bit by bit and the lubricant held in the recess $C_1$ when the sealing member 13' is attached infiltrates into the sliding face bit by bit. At the same time, because the first lip portion 13a' and the third lip portion 13c' adhere to the outer link plate 18 due to the deformation when the sealing member is attached, the lubricant will not leak quickly. Still more, because the sealing member 13' has a relatively large cross-sectional area and specifically has the cross-sectional area of the center base portion 13e', it will not be exhausted soon and can maintain the sealing function for a long period of time.

Still more, because the clearance i of the seal chain 11 can be small and hence the length of the pin 12 can be short, the seal chain 11 has high tensile strength and can transmit a large force. Still more, although a force in a transverse direction (width direction) may act on the chain due to engagement or the like with the sprocket, it is possible to avoid the metals, i.e., the bush head portion 17a and the outer link plate 18, from abutting each other even if the clearance i is small and hence the distance d between the edge f of the bush head portion 17a and the outer link plate 18 is small, because the sealing member 13' is made from hard rubber whose hardness Hs is 80 degrees or more, has a large cross-sectional area and the first lip portion 13a' compressed and deformed as described above is interposed between the outer link plate 18 and the bush head portion 17a.

Figure 4A:
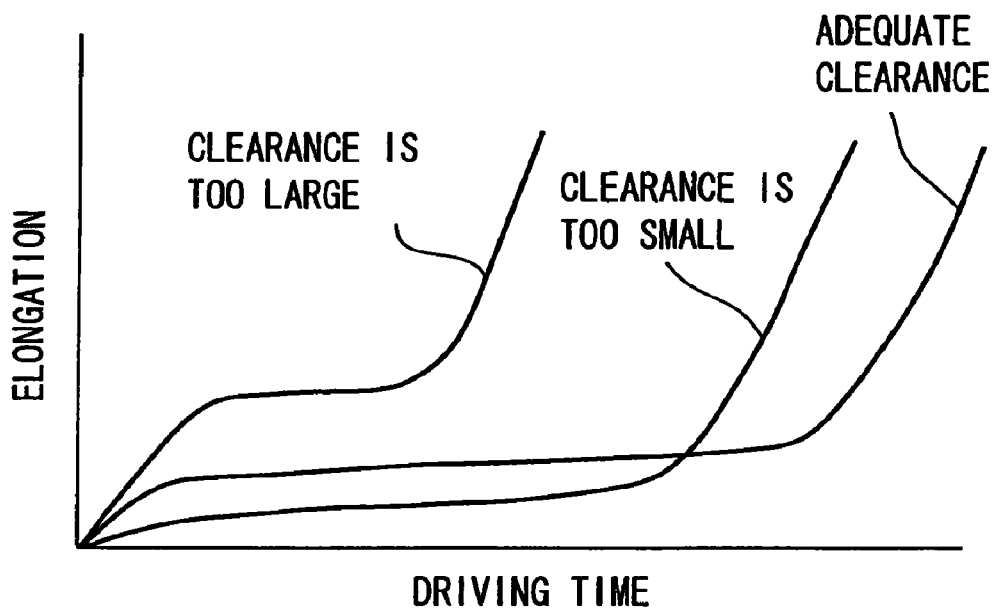
Figure 4B:
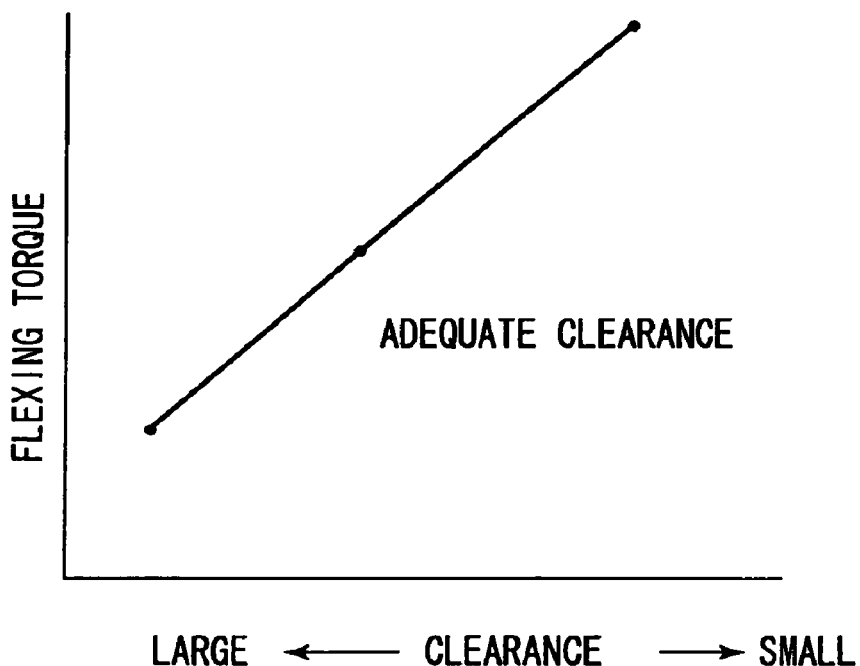

FIGS. 4A and 4B are graphs showing the clearance between the inner and outer link plates to which the inventive sealing member is suitably applied, wherein FIG. 4A shows a relationship between the clearance i and the abrasion resistance. When the clearance is too large, the sealing function of the sealing member 13 becomes insufficient, the lubricant is splashed out quickly and the chain extends rapidly in a relatively short driving time. When the clearance is too small on the other hand, the elongation of the chain increases rapidly if the sealing member is exhausted due to excessive compression after an elapse of a predetermined period of time, even if the sealing function of the sealing member, or that in a relatively short driving time, is sufficient. When the clearance is adequate with respect to the sealing member, the function of the sealing member is maintained for a long period of time, the driving time until a rapid increase of the elongation of the chain is longest and the sealing member exhibits excellent abrasion resistance.

FIG. 4B shows the relationship between the clearance i and flexing torque of the chain and shows that the larger the clearance, the smaller the compressing force of the sealing member becomes and accordingly the lower the flexing torque becomes. It also shows that the smaller the clearance, the greater the compressing force of the sealing member becomes and the greater the chain flexing torque becomes. Then, a range of clearance in which there is no problem in terms of the flexing torque or in which the flexing torque during high speed rotation, such as high speed driving of a motor cycle, is small, and in which the abrasion resistance described above is excellent, is the range of clearance optimally matched with the sealing member.

Figure 5A:
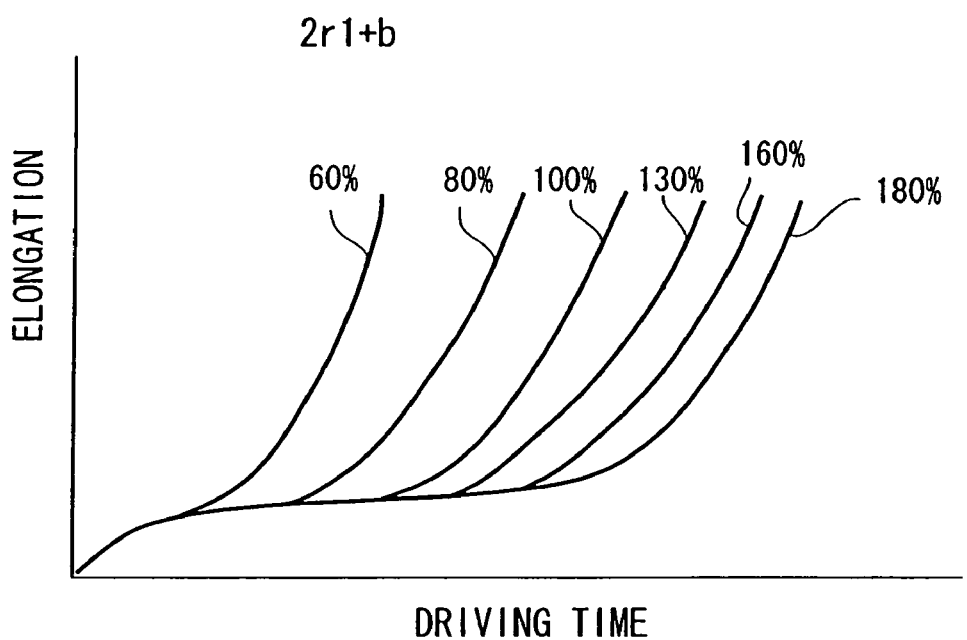
Figure 5B:
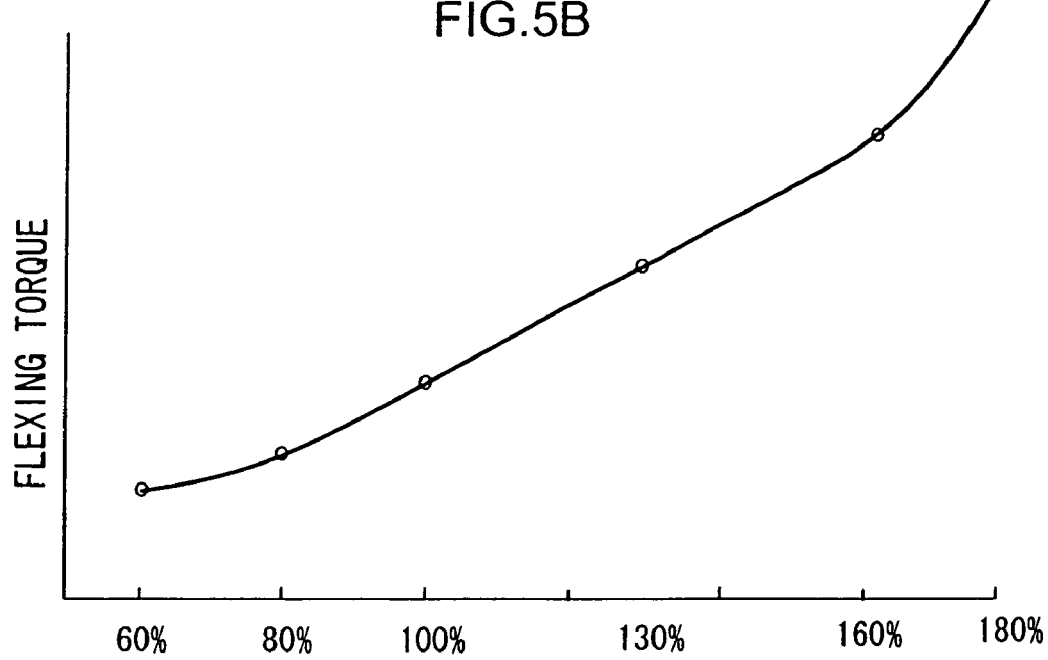
Figure 6A:
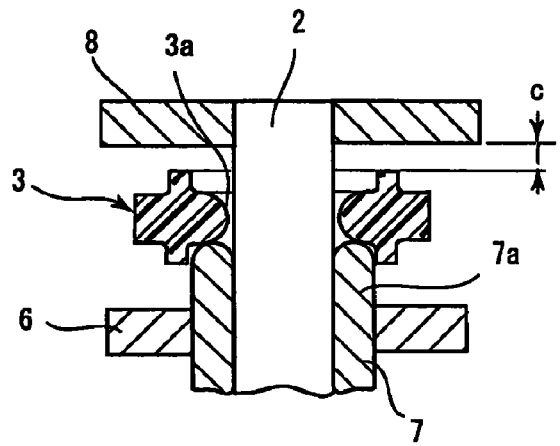
FIGS. 6A through 6C show different steps of a prior art seal chain manufacturing method.
Figure 6B:
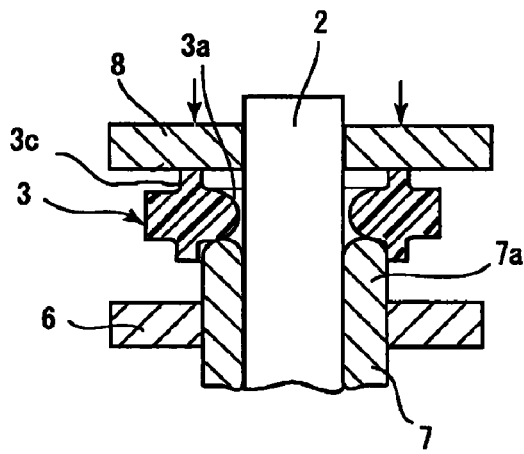
Figure 6C:
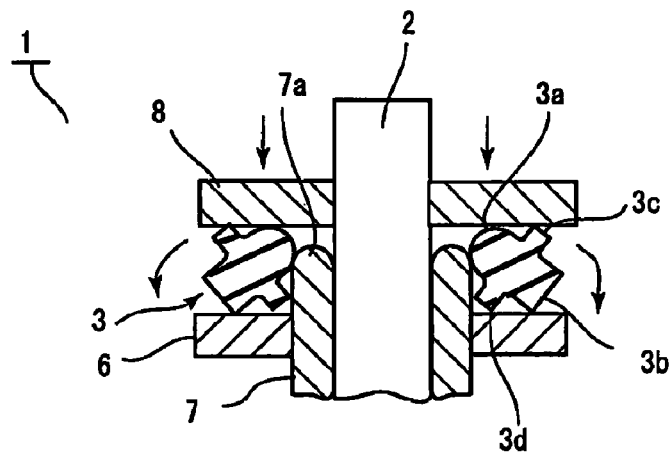

FIGS. 5A and 5B are graphs explaining an adequate value of the sum $(2r_1+b)$ of the width $2r_1$ of the first lip portion 13a of the sealing member 13 and the width b of the edge of the fourth lip portion 13d (the same applies to the third lip portion 13c), wherein FIG. 5A shows a relationship of the size and abrasion resistance of their sum $(2r_1+b)$ with respect to the clearance i. The smaller the sum $(2r_1+b)$, the smaller the deformation of the first and fourth lip portions 13a and 13d becomes, the less the sealing function is maintained and the shorter the abrasion resistance time becomes. The larger the sum, the longer the abrasion resistance time becomes. However, when it is 80% or less of the clearance i, e.g., 60%, the abrasion resistance time becomes short rapidly and when it is 160% or more, e.g., 180%, no more significant change occurs in its abrasion resistance.

FIG. 5B shows the relationship between the sum $(2r_1+b)$ and the flexing torque. The smaller the sum, the smaller the compressive deformation of the first and fourth lip portions 13a and 13d becomes and hence the smaller the flexing torque becomes. The greater the sum, the greater the flexing torque also becomes. However, when it is 80% or less of the clearance i, the rate of decrease of the flexing torque becomes low and when it is 160% or more, the flexing torque increases rapidly. Accordingly, as a range sustainable in actual use in which the abrasion resistance in (A) and the flexing torque in (B) are balanced, the sum $(2r_1+b)$ of the width $2r_1$ of the first lip portion 13a and the width b of the edge portion of the fourth lip portion 13d is set in a range of 80 to 160% of the clearance i $(0.8i \leqq (2r_1+b) \leqq 1.6i)$.

It is noted that the mode described above has been explained with the sealing member applied to a seal chain in which the clearance i between the both link plates has been reduced, but it can be also applied to a seal chain whose clearance i is equal to the conventional one. Still more, the sealing member can be applied regardless of the size of the chain by changing the size of the sealing member.

Although the invention has been described by way of the exemplary embodiments, it should be understood that those skilled in the art might make many changes and substitutions without departing from the spirit and scope of the invention. It is obvious from the appended claims that embodiments with such modifications also belong to the scope of the invention.

What is claimed is:

1. A seal chain comprising:
   an inner link plate having an opening therein;
   an outer link plate disposed with a clearance between said inner link plate and said outer link plate, said outer link plate being movable in a direction toward said inner link plate;
   a bush having a bush head portion projecting through said opening in said inner link plate into said clearance; and
   a sealing member, ring-shaped and disposed surrounding said bush head portion between said inner link plate and said outer link plate, said sealing member having a substantially plus-shaped cross-section, said sealing member including:
      a center base portion;
      a first lip portion having a cross-sectional shape of a circular arc, an ellipse, or an oval extending inward from said center base portion in a direction toward said bush head portion;
      a second lip portion extending outward from said center base portion in a direction away from said bush head portion;
      a third lip portion extending from said center base portion in a direction transverse to said first lip portion and said second lip portion, said third lip portion having an inner side face extending along a direction approximately orthogonal to a radial direction of said sealing member and an outer side face sloped so that a width of said third lip portion increases continuously along its entire length from an edge portion of said third lip portion toward said center base portion; and a fourth lip portion extending from said center base portion in a direction opposite said third lip portion, said fourth lip portion having an inner side face extending along a direction approximately orthogonal to said radial direction of said sealing member and an outer side face sloped so that a width of said fourth lip portion increases gradually continuously along its entire length from an edge portion of said fourth lip portion toward said center base portion, wherein said third lip portion and said fourth lip portion are mirror-symmetrical with respect to each other, wherein said outer side face of said third lip portion is a uniformly tapered face having a predetermined gradient, or said outer side face of said third lip portion is a tapered face having a circular arc and a radius of curvature of said circular arc is greater than a radius of curvature of a curve connecting said third lip portion to said first lip portion, wherein a ratio of a diagonal distance across said center base portion of said sealing member to a distance of said clearance is in a range of 0.8 to 1.0, and wherein said seal member is disposed with said first lip portion between an edge of said bush head portion and said outer link plate, as to be rotatable and deformable into a shape having a substantially X-shaped cross-section by a movement of said outer link plate in a direction toward said inner link plate.

2. The seal chain as set forth in claim 1, wherein a ratio of a width of a narrowest portion of said first lip portion on a side toward said center base portion to said distance of said clearance is in a range of 0.5 to 0.6.

3. The seal chain as set forth in claim 1, wherein a ratio of a sum of a width of said first lip portion and a width of an edge portion of said third lip portion to said distance of said clearance is in a range of 0.8 to 1.6.

4. The seal chain as set forth in claim 1, wherein said distance of said clearance is within a range of 4% to 7% of a chain pitch.

5. The seal chain as set forth in claim 1, wherein said outer side face of said third lip portion is said uniformly tapered face having said predetermined gradient in a range of 60° to 70°.

6. A method for manufacturing a seal chain, the method comprising:
   projecting a bush head portion of a bush through an opening in an inner link plate;
   disposing a sealing member having a ring-shape so as to surround the bush head portion between the inner link plate and the outer link plate, the sealing member having a substantially plus-shaped cross-section, the ring-shaped sealing member including:
   a center base portion;
   a first lip portion having a cross-sectional shape of a circular arc, an ellipse, or an oval extending inward from the center base portion in a direction toward the bush head portion;
   a second lip portion extending outward from the center base portion in a direction away from the bush head portion;
   a third lip portion extending from the center base portion in a direction transverse to the first lip portion and the second lip portion, the third lip portion having an inner side face extending along a direction approximately orthogonal to a radial direction of the sealing member and an outer side face sloped so that a width of the third lip portion increases continuously along its entire length from an edge portion of the third lip portion toward the center base portion; and
   a fourth lip portion extending from the center base portion in a direction opposite the third lip portion, the fourth lip portion having an inner side face extending along a direction approximately orthogonal to the radial direction of the sealing member and an outer side face sloped so that a width of the fourth lip portion increases continuously along its entire length from an edge portion of the fourth lip portion toward the center base portion; and
   disposing an outer link plate so as to have a clearance between the inner link plate and the outer link plate, the outer link plate being movable in a direction toward the inner link plate, wherein the third lip portion and the fourth lip portion are mirror-symmetrical with respect to each other, wherein the outer side face of the third lip portion is a uniformly tapered face having a predetermined gradient, or the outer side face of the third lip portion is a tapered face having a circular arc and a radius of curvature of the circular arc is greater than a radius of curvature of a curve connecting the third lip portion to the first lip portion, wherein a ratio of a diagonal distance across the center base portion of the sealing member to a distance of the clearance is in a range of 0.8 to 1.0, and wherein said disposing of the seal member is so that the first lip portion is between an edge of the bush head portion and the outer link plate so that the seal member is rotatable and deformable into a shape having a substantially X-shaped cross-section by a movement of the outer link plate in a direction toward the inner link plate.

7. The method for manufacturing a seal chain as set forth in claim 6, wherein a ratio of a width of a narrowest portion of the first lip portion on a side toward the center base portion to the distance of the clearance is in a range of 0.5 to 0.6.

8. The method for manufacturing a seal chain as set forth in claim 6, wherein a ratio of a sum of a width of the first lip portion and a width of an edge portion of the third lip portion to the distance of the clearance is in a range of 0.8 to 1.6.

9. The method for manufacturing a seal chain as set forth in claim 6, wherein said disposing of the seal member is further so that the distance of the clearance is within a range of 4% to 7% of a chain pitch.

10. The method for manufacturing a seal chain as set forth in claim 6, wherein said outer side face of said third lip portion is said uniformly tapered face having said predetermined gradient in a range of 60° to 70°.

* * * * *